SEMI-CONDUCTOR DEVICES OF THE WIDE-GAP ELECTRODE TYPE

Filed Oct. 18, 1961

INVENTOR
HEINZ DIEDRICH
KLAUS JÖTTEN
BY
Frank R. Jifari
AGENT 3,210,222
SEMI-CONDUCTOR DEVICES OF THE WIDE-GAP ELECTRODE TYPE Heinz Diedrich, Hamburg, and Klaus Jotten, Hamburg, Blankenese, Germany, assignors to North American Philips Company, Inc., New York, N.Y., a corporation of Delaware Filed Oct. 18, 1961, Ser. No. 145,815
Claims priority, application Germany, Oct. 20, 1960, P 25,887
4 Claims. (Cl. 148—33)

Figure 1:
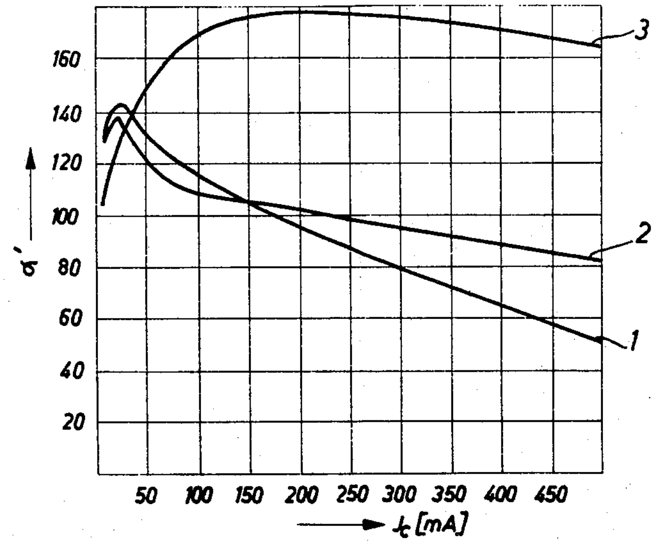

This invention relates to methods of manufacturing semi-conductor devices and more particularly transistors of germanium having one or more junctions, more particularly p-n-junctions, wherein at least one junction is obtained by melting-deposition of a material which, upon cooling, produces a recrystallized semi-conductor zone on the body of the semi-conductor device, said recrystallized semi-conductive zone having a wider energy gap than that of the body of the semi-conductor device.

It is known that the share of the emitter current in a transistor which still effectively adds to the collector current for high currents decreases with increasing current, that is to say, for example in the case of a p-n-p-transistor, that the ratio of the holes injected into the base by the emitter to the electrons flowing from the base into the emitter steadily decreases for higher current. This undesirable property of a transistor, namely the decrease in current amplification with increasing current, has given rise to the search for methods of raising this ratio also for comparatively high currents. Since with an ordinary p-n-junction, that is to say a p-n-junction in which both the p- and n-zones are semi-conductors with equal gaps, the ratio of the currents depends substantially upon the specific resistance of the semi-conductors forming the p- and n-zones, attempts have been made to increase the said ratio by particularly high doping (very low specific resistance) of the emitter zone with respect to the base zone. An arbitrary increase in the conductivity of the emitter zone relative to that of the base zone is impossible for technological and electrical reasons. This limit of the injection quality of ordinary p-n-junctions, which is determined by the method of manufacture and the electrical behaviour, may be avoided by the use of wide-gap emitters.

In fact, it is also known that the emitter of a transistor preferably passes charge carriers of the desired kind from a semi-conductor having a gap wider than that of the base material and hinders the charge carriers of the unwanted kind to a comparatively great extent due to the existing quasi-electrical field. This effect plays a part not only for the emitter of a transistor for which the prevailing conditions have been explained hereinbefore, but may in general also have favourable results in semi-conductor devices having one or more p-n-junctions and junctions between material of a wider gap and material of a smaller gap, wherein the same conductivity type exists on both sides of the junction.

As is well-known, germanium and silicon form mixed crystals in which the gap increases with increasing content of silicon. The gap of the germanium is greatly increased already by a silicon content which is less than 15%, so that silicon contents of several percent already suffice for obtaining a noticeable increase in the gap of the mixed crystal.

However, it is impossible to alloy a silicon electrode on germanium since the melting point of the alloy silicon-germanium is higher than the melting point of germanium itself.

The present invention permits of eliminating these difficulties. To this end, in a method of manufacturing a semi-conductor device, more particularly a transistor, of germanium having one or more junctions, more particularly p-n-junctions, wherein at least one junction is obtained by melting-deposition of a material which upon cooling forms a recrystallized semi-conductive zone, on the body of the semi-conductor device, which recrystallized semi-conductive zone has a wider gap than the body of the semi-conductor device, according to the invention an alloy at least of silicon and one or more elements of the III-group, together with at least one of the elements germanium, tin, bismuth, gold, silver or zinc, containing at least 50 at. percent of one of the elements indium, tin and bismuth is melted on the body for obtaining the junction.

The object of such additions is that the alloy can mechanically be processed more readily and pellets may be formed from the alloy which may be melted on the body in known manner. However, the alloy may also be melted on the body, for example as a cylindrical part such as in the form of plates.

In addition, an alloy containing a proportion of at least 50 at. percent of indium, tin or bismuth permits the manufacture of wide-gap p-n-junctions of good reproducibility, since the monocrystalline growth of a germanium-silicon mixed crystal on the germanium body takes place in a manner highly free from interference in the presence of a component having a diluting activity and, due to its structure which can readily be deformed mechanically, a leveling effect on the crystal strains.

Very suitable alloys are, for example, those consisting of silicon, one or more elements of the III-group of the periodic table, which includes, as is usual in this art, the elements boron, aluminum, gallium, indium, and thallium, and at least one element forming with both silicon and germanium, eutectic or quasi-eutectic alloying systems the melting temperatures of which are lower than that of germanium.

The statement following hereinafter includes examples of such eutectic or quasi-eutectic systems with melting temperatures below that of germanium.

(A) Binary systems:
- In-Si, In-Ge
- Zn-Si, Zn-Ge
- Ag-Si, Ag-Ge (B) Ternary systems:
- Au-Sn-Si, Au-Sn-Ge
- Au-In-Si, Au-In-Ge
- Ag-In-Si, Ag-In-Ge
- Ag-Sn-Si, Ag-Sn-Ge
- Au-Bi-Si, Au-Bi-Ge
- Ag-Bi-Si, Ag-Bi-Ge (C) Quaternary systems:
- Au-Si-Ge-In
- Au-Si-Ge-Sn
- Ag-Si-Ge-In
- Ag-Si-Ge-Sn
- Au-Si-Ge-Bi
- Ag-Si-Ge-Bi The invention will now be explained with reference to examples of several embodiments.

Figure 2:
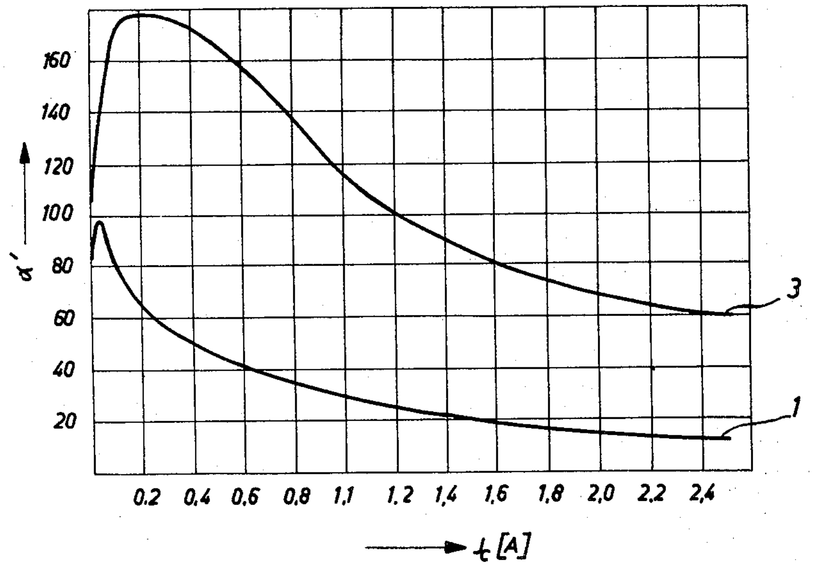

FIGURES 1 and 2 serve to illustrate the improved efficiency of a transistor.

*Embodiment 1*

A p-n-p transistor is manufactured by the conventional alloying technique. In carrying out the method according to the invention, for the manufacture of an emitter, an alloy of 5 mol. percent of the eutectic gold-silicon and 1.2 at. percent of gallium, with the balance of indium, is manufactured by melting together in an atmosphere of hydrogen at 500° C. The homogeneous melt is cooled to room temperature within 1 minute, which guarantees a fine-granular homogeneous division of the alloyed phase. A pellet is made from the resulting alloyed material and melted on the body of the semi-conductor device.

To prevent components from the alloy to be provided by melting from diffusing into the body to an ascertainable extent, the melting period and melting temperature are chosen so that the term $\sqrt{Dt}$ occurring in the diffusion law is, for example, smaller than $10^{-5}$ cm., wherein $t$ is the melting period in seconds, and D, in cm.$^2$/sec., is the diffusion constant of the acceptor or donor element of the III- or V-group present in the alloy which diffuses into the material of the body at the melting temperature with maximum velocity. This remark also applies to to the further examples of embodiments. In the Embodiment 1 the condition is fulfilled, provided that the melting temperature is lower than 700° C. (it adapts itself to the desired depth of the p-n-junction) and the alloying period is shorter than 30 minutes.

FIGURE 1 shows the improved operation of such a transistor. The collector current $I_c$ is plotted on the abscissa and the current amplification factor $\alpha^1$ determined in the usual manner is plotted on the ordinate. Curves 1 and 2 show the dependency of $\alpha^1$ upon the collector current $I_c$ in ordinary transistors the configuration of which exactly corresponds to the transistor to be compared having an emitter made of an alloy according to the invention. Curve 3 shows the dependency of $\alpha^1$ upon the collector current $I_c$ in a transistor having an emitter made of an alloy according to the invention. The considerably slower decline of $\alpha^1$ to its maximum with increasing collector current with respect to transistors of the ordinary type can be seen very clearly.

FIGURE 2 corresponds to FIGURE 1, except that a larger range of collector currents is plotted on the abscissa.

*Embodiment 2*

A p-n-p-transistor is manufactured by the conventional alloying technique. In carrying out the method according to the invention, for the manufacture of an emitter, an alloy of 10 mol. percent of silver-germanium-silicon in the atomic ratio 75:20:5 and 1 at. percent of gallium, with the balance of indium, is manufactured by melting together in an atmosphere of hydrogen-nitrogen at 700° C. The homogeneous melt is cooled to room temperature within 1 minute, which guarantees a fine-granular homogeneous division of the alloyed phases. A pellet is made from the resulting alloyed material and melted on the body of the semi-conductor device. The melting temperature is 700° C. or lower and adapts itself to the desired depth of the p-n-junction. The alloying period is shorter than 30 minutes.

*Embodiment 3*

A p-n-p-transistor is manufactured by the conventional alloying technique. In accordance with the method of the invention, for the manufacture of the emitter, an alloy of 8 mol. percent of the eutectic gold-silicon and 2 at. percent of gallium and/or indium, with the balance of tin, is manufactured by melting together at 600° C. The melt is cooled to room temperature within 1 minute. A pellet made from the alloy is melted on the body of the semi-conductor device. The melting temperature is 700° C. or lower. The alloying period is shorter than 30 minutes.

*Embodiment 4*

A p-n-p-transistor is manufactured by the conventional alloying technique. In carrying out the method according to the invention, for the manufacture of the emitter, an alloy of 20 at. percent of the eutectic gold-silicon and 78 at. percent of bismuth, with the balance of gallium and/or indium, is melted on the body of the semi-conductor device.

Transistors manufactured according to the invention show the advantageous behaviour of $\alpha^1$ with increasing collector current, as may be seen from curve 3 in FIGURES 1 and 2.

What is claimed is:

1. A semi-conductor device comprising a semi-conductive body of germanium, and a mass surface-fused and alloyed to the germanium producing in the body a silicon-containing recrystallized region having a wider energy gap than that of germanium and forming a junction exhibiting improved current amplification characteristics, said mass consisting essentially of an alloy containing at least four different constituents, a first constituent being a minor amount of silicon, a second constituent being at least one element selected from Group III of the Periodic Table consisting of boron, aluminum, gallium, indium and thallium, a third constituent being at least one element selected from the group consisting of germanium, tin, bismuth, gold, silver, and zinc, and a fourth constituent being indium and constituting at least 50 atomic percent of said alloy, said resultant alloy having a melting point below that of germanium.

2. A semiconductor device as set forth in claim 1 wherein the alloy consists essentially of an element selected from the group consisting of silver and gold, silicon, at least 50 atomic percent of indium, and more than zero but less than 5 atomic percent of gallium.

3. A semi-conductor device comprising a semi-conductive body of germanium, and a mass surface-fused and alloyed to the germanium producing in the body a silicon-containing recrystallized region having a wider energy gap than that of germanium and forming a junction exhibiting improved current amplification characteristics, said mass consisting essentially of an alloy containing at least four different constituents, a first constituent being a minor amount of silicon, a second constituent being at least one element selected from Group III of the Periodic Table consisting of boron, aluminum, gallium, indium and thallium, a third constituent being at least one element selected from the group consisting of germanium, tin, bismuth, gold, silver, and zinc, and a fourth constituent being bismuth and constituting at least 50 atomic percent of said alloy, said resultant alloy having a melting point below that of germanium.

4. A semi-conductor device as set forth in claim 2 wherein the alloy consists essentially of an element selected from the group consisting of silver and gold, silicon, at least 50 atomic percent of bismuth, and more than zero but less than 2 atomic percent of an element selected from the group consisting of gallium and indium.

References Cited by the Examiner

UNITED STATES PATENTS

| | | | |
|---|---|---|---|
| 3,076,731 | 2/63 | Wannlund | 148—185 |
| 3,078,397 | 2/63 | Tummers et al. | 148—185 |
| 3,111,611 | 11/63 | Hunter | 148—1.5 |

FOREIGN PATENTS

| | | |
|---|---|---|
| 805,493 | 12/58 | Great Britain. |

HYLAND BIZOT, *Primary Examiner.*

WINSTON A. DOUGLAS, DAVID L. RECK, *Examiners.*